(12) United States Patent
Hanneman, Jr.

(10) Patent No.: US 6,532,317 B2
(45) Date of Patent: Mar. 11, 2003

(54) OPTICAL CIRCUIT BOARD

(75) Inventor: Raymond J. Hanneman, Jr., Milwaukee, WI (US)

(73) Assignee: Polyoptic Technologies, Inc., Milwaukee, WI (US)

( * ) Notice: Subject to any disclaimer, the term of this patent is extended or adjusted under 35 U.S.C. 154(b) by 46 days.

(21) Appl. No.: 09/836,300

(22) Filed: Apr. 17, 2001

(65) Prior Publication Data

US 2001/0046342 A1 Nov. 29, 2001

Related U.S. Application Data

(60) Provisional application No. 60/197,879, filed on Apr. 17, 2000.

(51) Int. Cl.[7] .................................................. G02B 6/12
(52) U.S. Cl. ............................ 385/14; 385/31; 385/123
(58) Field of Search ........................... 385/14, 15, 31, 385/50, 123, 127, 129, 88, 49, 16, 24

(56) References Cited

U.S. PATENT DOCUMENTS

| | | |
|---|---|---|
| 5,132,530 A * | 7/1992 | Groh et al. .................. 385/121 |
| 5,421,019 A | 5/1995 | Holsztynski et al. |
| 5,450,224 A | 9/1995 | Johansson |
| 5,452,383 A | 9/1995 | Takiguchi |
| 5,475,704 A | 12/1995 | Lomashevich |
| 5,640,261 A | 6/1997 | Ono |
| 5,704,015 A | 12/1997 | Ono |
| 5,714,304 A | 2/1998 | Gibbons et al. |
| 5,757,525 A | 5/1998 | Rao et al. |
| 5,777,776 A | 7/1998 | Hiraga et al. |
| 5,881,196 A * | 3/1999 | Phillips ....................... 385/137 |
| 5,940,193 A | 8/1999 | Hotaling et al. |

* cited by examiner

*Primary Examiner*—Hemang Sanghavi
(74) *Attorney, Agent, or Firm*—Ryan Kromholz & Manion, S.C.

(57) ABSTRACT

The present invention provides a method and apparatus for an optical processor. Polymerizable compounds in a specific composition containing photo-reactive materials, optically polar materials, and optical materials which can be cured with actinic radiation to form polymeric compositions, are provided. The resultant polymeric compositions are capable of forming complex optical interconnecting network structures.

8 Claims, 3 Drawing Sheets

Fig. 1

| Oligomers | Rf | Oligomers | Rf |
|---|---|---|---|
| Eb 800 | 1.4711 | 870 | 1.4895 |
| 220 | 1.5711 | 1657 | 1.5009 |
| 230 | 1.5008 | 1701 | 1.4850 |
| 244 | 1.4625 | 1810 | 1.4635 |
| 264 | 1.4908 | 1830 | 1.4990 |
| 265 | 1.4785 | 3700 | 1.5555 |
| 270 | 1.4750 | 3700-20H | 1.5341 |
| 285 | 1.4819 | 3700-20T | 1.5400 |
| 436 | 1.5085 | 3700-25R | 1.5283 |
| 438 | 1.5056 | 3701 | 1.5265 |
| 450 | 1.4875 | 3701-20T | 1.5150 |
| 524 | 1.5304 | 3702 | 1.5449 |
| 584 | 1.5270 | 3703 | 1.5210 |
| 586 | 1.5320 | 4827 | 1.4827 |
| 600 | 1.5549 | 4830 | 1.4911 |
| 605 | 1.5235 | 4834 | 1.4889 |
| 657 | 1.4991 | 4866 | 1.4845 |
| 745 | 1.4765 | 4881 | 1.4924 |
| 754 | 1.4763 | 4883 | 1.4801 |
| 769 | 1.4809 | 6700 | 1.5030 |
| 770 | 1.4949 | 8301 | 1.4924 |
| 810 | 1.4641 | 8800 | 1.4901 |
| 830 | 1.500 | 8800-20R | 1.4810 |
|  |  | 8806 | 1.4943 |

| Wavelength (nm) | % Trans | % Absorbed |
|---|---|---|
| 240 | 4.63 | 95.36 |
| 249 | 6.28 | 93.71 |
| 254 | 13.83 | 86.16 |
| 255 | 16.54 | 83.45 |
| 258 | 28.25 | 71.74 |
| 260 | 40.37 | 59.62 |
| 265 | 56.79 | 43.20 |
| 270 | 74.83 | 25.16 |
| 276 | 76.03 | 23.96 |
| 280 | 76.84 | 23.15 |
| 289 | 85.38 | 14.61 |
| 292 | 88.43 | 11.56 |
| 297 | 93.76 | 6.23 |
| 302 | 97.38 | 2.61 |
| 313 | 97.51 | 2.48 |
| 334 | 97.48 | 2.51 |
| 365 | 99.53 | 0.46 |
| 405 | 100.0 | 0.0 |
| 435 | 100.0 | 0.0 |
| 545 | 100.0 | 0.0 |
| 580 | 100.0 | 0.0 |

OPTICAL CIRCUIT BOARD

RELATED APPLICATION

This application claims the benefit of U.S. Provisional Application No. 60/197,879 filed Apr. 17, 2000.

BACKGROUND OF THE INVENTION

Optical interconnection devices such as optical wave guides have been designed for application of chip-to-chip connections and other electrical components. The advantages of the use of organic polymer films are the large signal band widths and reduced propagation delay, and are amenable to solution spin casting and other techniques. Organic polymers have lower dielectric constants and can have large electro-optic or other nonlinear optical responses that are electronic in origin and therefore have low loses even in high frequency regimes.

Standard lithography processes, together with dry etching, have been used to create experimental integrated optical wave guides. Optical wave guides have been formed in organic films by inducing refractive index changes by ultraviolet light in methods such as (1) photochemical crosslinking, followed by dissolution of the remaining uncross linked material (2) "photo-locking" i.e. photochemical attachment, dimerization or polymerization of high refractive index monomer in a transparent polymer matrix film, followed by baking to remove the remaining volatile monomer from non-irradiated areas; (3) pattered argon ion laser irradiation; (4) thermal annealing; and (5) electron beam radiation.

Formation of wave guide structures in optical organic materials through the photochemical transformation disclosed, for example in U.S. Pat. Nos. 4,783,136, 4,889, 405 and 5,054,872.

Past methods and active media for controlled production and optical access of data include controlled differences in absorption characteristics of molecules at selected regions. This involves the use of at least two intersecting beams of radiation which are matched to selected optical properties of an active media. A bit of data at a selected portion of a region of active media is accessed by directing a first beam having a first electromagnetic radiation characteristics matched to a first optical characteristic of the media at the region to change the condition of the media to a second characteristic. This second characteristic may be of either low or high optical reactivity, depending on the bit valve at programmed portions of the region. The second characteristic is relative to a second radiation characteristic, other than the first radiation characteristic, then directing a second beam matched to the second electromagnetic radiation characteristic to intersect the region at a selected portion containing the bit of data to be accessed to permit optical sensing of the state of the bit.

Full optical type optical elements perform information processing on an input signal light beam through the use of light beams including the signal light beam and an auxiliary light beam for assisting operation. The optical element includes aggregates which are dispersed within the optical element as optical functional aggregates, and which are composed of a single kind or multiple kinds of compounds including a single species of atoms or molecules. Aggregates are dispersed within a transparent polymer film and are responsive to auxiliary light beam to perform a function on an input signal light beam to produce an output signal beam.

This invention is designed to process information using optical materials in a complex network structure which is referred to as the interconnecting network structure, herein referred to as the "optical cell". Other patents such as U.S. Pat. Nos. 5,136,682 and 5,273,863, document the use of polymeric materials to form optical films for interconnecting opto-electric devices and systems. The present invention is based on the total optical process that does not require any such interconnection of opto-electric processing devices and/or systems.

SUMMARY OF THE INVENTION

An optical processor is formed of an polymer material base preferably using an acrylic polymer. The acrylic polymer material is formed into a network of optical pathways, such as rows and columns, such that a matrix is provided. The matrix is formed with a variety of optically active materials to thereby produce a gate-like system able to optically manipulate information. The present invention uses an acrylic polymer material in a multiple branched structure wherein each individual node or gate represents a particularized set of frequencies for light passing therethrough. Optically active materials are infused into the optical processing cells formed within the matrix and are activated upon light passing through the optical processing cells.

The manufacture of the optical network structure is based on techniques similar to lithographic principles, not excluding other processes, used in the manufacturing of printed circuit boards, electronic processors, and lithographic printing.

It is an object of the present invention to provide polymeric materials, and optical materials, for the formation and structure of an interconnecting optical network structures, and the manufacture of such devices and systems.

A further object of the present invention is to provide polymeric compositions and the combination of optical materials used to form an interconnecting network structure able to adhere to a broad number of substrates.

Another object of the present invention is to provide an interconnecting network structure which form optical data processing devices wherein beams of light which are input into the devices cause activation of photoreactive nodes located in the network structure to cause the emission of secondary light beams of selected frequencies which are then used to produce readable digital information.

Yet another important object of the present invention is to provide a method for forming polymeric compositions containing optically polaring material used in conjunction with the photoreactive material located where needed in the interconnecting network structure.

Another specific object of the present invention is to provide polymeric compositions into which the optically polar material(s) and photoreactive material(s) are inserted for use in forming interconnecting network structures for optical processing. Further, the compositions show excellent multi-layer adhesion and are sufficiently thermally stable at temperatures in excess of 300° F.

Yet another specific object of the present invention is to provide polymeric composition(s), containing optically polar material(s) and photoreactive material(s) in an interconnecting network structure, formulations which manifest suitable optical properties, which are capable of being handled during fabrication of the optical network processor, and other optical materials which are curable by exposure to actinic radiation and which manifest improved adhesion to other polymeric composition(s) layers and difficult substrates, such as quartz, crystalline substrates, polyimide, polypropylene, polyvinylchloride, and other materials commonly known.

Another object of the present invention is to provide methods of combining the polymeric composites to form the interconnecting network structure to optical silicon structures that are specifically fine tuned for desired optical effects.

A still further object of the present invention is to provide the structure of the polymeric composition and the optically polar and photo-reactive materials of the interconnecting network structure wherein alternate paths for transmission of light beams of controlled frequencies emitted by the photo-reactive nodes are of precise lengths required for selectively augmenting the strength of the beams by positive interference or canceling out of the beams by means of negative interference.

Yet another specific object of the present invention is to provide a method of attaching available optical storage devices such as photo-refractive optical storage devices, which store information in optical recording media such as, but not excluding other materials, $BaTiO_3$, $KNbO_3$, $LiNbO_3$, $Srl-xBaxNb_2O_6$ (SBN), $Bal-xSrKl-yNaNb_5O_{15}$(BSKNN), $Bil_2SiO_2O$(BSO), $Bil_2GeO_2O$(BGO), GaAs, InP, GeP, and CdTe.

One more specific object of the present invention is to provide the method of forming the polymeric composition containing optically polar material and photo-reactive material to create an optical network processor.

Further, in accordance with the present invention, novel methods are provided for forming the polymeric composition for the interconnecting network structure that are cured in selected areas by actinic radiation. The methods disclosed are particularly useful in lithographic systems and processes in the preparation of interconnecting optical network structure.

One aspect of this invention provides the types of polymers and combinations of polymers for the preparation of the polymeric composition interconnecting network structure.

Another aspect of this invention provides the possible formulations, for the of an interconnecting optical network structure.

Another aspect of this invention provides precisely positioned optically polar materials used in the formation of the interconnecting optical network structure.

Yet another aspect of the invention provides photo-reactive materials contained in the interconnecting optical network structure.

A further aspect of this invention provides additives which may be included in the polymeric composition for the formation of the interconnecting optical network structure.

A yet further aspect of this invention provides polymeric compositions containing optically polar and photo-reactive materials which form the interconnecting optical network structure that has been formed by curing selected areas by actinic radiation through an appropriate mask structure.

A still further aspect of this invention provides a method for forming the base polymeric composition on a substrate. This method comprises the steps of:

1. Placing a clad precursor layer on at least a part of the surface of the substrate.
2. Forming a specific core composition of polymeric formula that has a higher refractive index than the clad layer.
3. Curing the layers whereby a film is formed of primer which is securely adhered to a substrate.

Another aspect of this invention provides a method of forming a polymeric composition layer onto the surface of the primary layer which forms the interconnecting optical network structure.

Another aspect of this invention describes a method which combines the optically polar material, the photo-reactive material, or other optical material into the core polymeric composition used to form a node in the interconnecting network structure.

Another significant aspect of this invention discloses a structure that forms a matrix capable of performing data manipulation such as numeric operations, logic processes, and binary processes.

Another aspect of this invention discloses a light transmissive structure containing optically polar materials and photo-reactive materials which emit light when activated by a primary light source whereby an interconnecting network structure capable of processing data for numeric and logic is formed.

Another further aspect of this invention provides a method of connecting fiber optics and photo-refractive storage devices and or similar systems to an interconnecting network structure.

Another aspect of this invention provides a method of connecting optical materials, including fiber optical material, to the interconnecting network structure in the formation of interconnecting the device to other devices and/or systems.

Yet another aspect of this invention provides a method of using an interconnecting network structure to perform data processing functions.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 2:
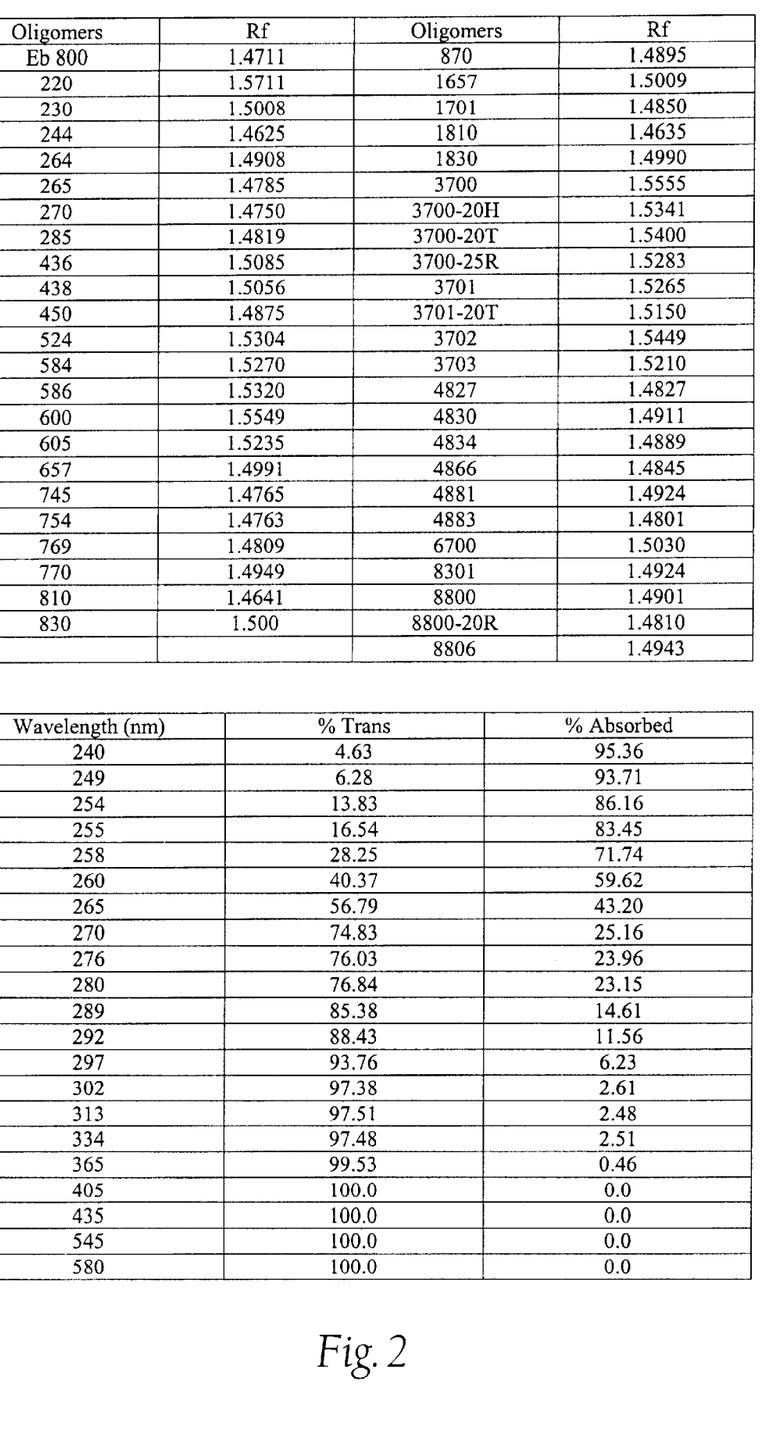
FIG. 2 is a table listing refractive indices of various polymer oligomers useful in the practice of the invention.

To build the optical circuit device an interconnecting network based on optical fiber parameters must be designed. This goal is accomplished by identifying and calculating the total internal reflection required to transmit the selected frequency of light used as the main signal source. The formula is $\theta_c = (\sin/1)n_2/n_1$. Here, $\theta_c$ is the maximum angle at which a light beam can enter an optical pathway, while $n_1$ and $n_2$ are the refractive indices of the core and clad layer, respectively. The materials selected to construct the optical interconnection are based on the urethane acrylates, acrylate esters, epoxy acrylates, elastomeric acrylates, methacrylates, triacrylates, diacrylates and dimethylacrylates. Plasticizers, crosslinking agents, photoinitiators, radical scavengers, organic optical polar materials, photo-reactive materials, phosphorescent and fluorescent materials, inorganic optical materials, which undergo curing by UV light are incorporated into these compositions as required to form the structure. The first step is to select the base layer with a lower refractive index than the core material. For example, in formulating the base clad material with Ebecryl 810 (from Radcure) a reflective index of 1.4641 is obtained. In formulating the core material using Ebecryl 3700 as the acrylic polymer, a refractive index of 1.5555 is obtained. A starting composition for the base is as follows:

| Chemical | wt % |
| --- | --- |
| Ebecryl 810 resin | 35.2 |
| Propoxylated glycerol triacrylate | 23.75 |
| Trimethylolpropane triacrylate | 8.75 |
| Tripropylene glycol diacrylate | 17.3 |
| Beta-carboxethyl acrylate | 10.0 |
| Irgacure 500 (photoinitiator) | 5.0 |
| Total: | 100 |

A preferred core composition is:

| Chemical | wt % |
| --- | --- |
| Ebecryl 3700 resin | 35.2 |
| Propoxylated glycerol triacrylate | 23.75 |
| Trimethylolpropane triacrylate | 8.75 |
| Tripropylene glycol diacrylate | 17.3 |
| Beta-carboxethyl acrylate | 10.0 |
| Irgacure 500 (photoinitiator) | 5.0 |
| Total: | 100 |

Using the above-noted base formula it is possible to formulate various compositions to give different index of refraction values to create the desired wave guide characteristics. It is to be understood that the foregoing composition formulae are intended as an examples only, and that many other formulas may be substituted depending upon the desired ratios or desired index of refraction. In the formation of an optical polymer composite, which forms the optical "circuit board" and optical gate structure, the materials must satisfy a number of requirements and properties. Among the numerous properties the composite formula must produce high optical transparency at wavelengths from 200–2000 nm (preferably, 405–2000 nm range), rapid and complete curve characteristics, workable fluid phase precursor, selective and specific refractive indices. These composite formulations must also be able to adhere securely to various substrate materials.

These materials will produce an interconnecting network that will allow a light signal to be transmitted. To construct the optical circuit a phototool is constructed using standard lithographic processes incorporating the physical principles of phase relation between two light signals. In the formation of the core design the optical coherence, constructive and destructive interference are the main principles used to calculate the design of the optical wave guides. The formula for constructive interference is $\sin \theta_m = m\lambda/d$ and for destructive interference is $\sin \theta_m = (m+\frac{1}{2}) \lambda /d$, where $\sin \theta_m$ is the angle of the light path where the light beams intersect, m is an integer representing the actual frequency, $\lambda$ is the frequency of light, and d is the distance between each light beam if the light is passing through a slit film. In case of fiber optic or a wave-guide, the d factor is the length of the optical cell or pathway. These formulae are used to calculate the design of the signal path which will create the first part of an optical logic gate.

Figure 1:
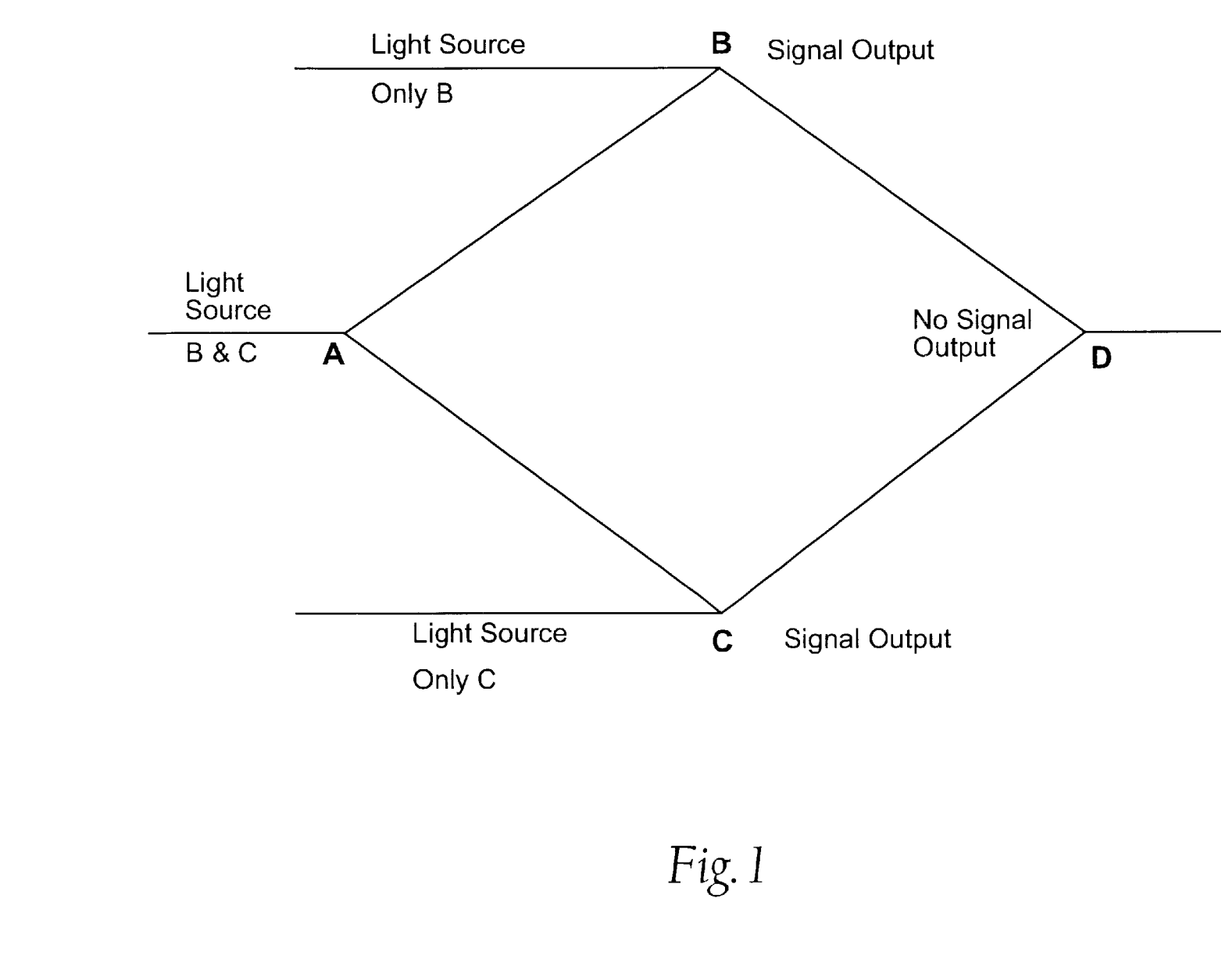
FIG. 1 shows a simplified optical circuit with a primary light signal source split into two beams and a secondary light beams emitted at nodes B and C being superposed at D.

A simplified gate design is depicted in FIG. 1 wherein a light source A is split into two coherent beams by an internal beam splitter imbedded into a waveguide, the two split signals traverse path B and C and superpose at point D.

Using the formula for destructive interference, the signal from path B will be out of phase from that of path C by 180°. At point D the signal will be canceled. At this point the device is at a continuous "off state". To create the "on-off state", optically active materials, specifically phosphorescent or fluorescent materials, are incorporated into paths B and C. These optically active materials react to the respective split beams by which they are impacted to produce secondary light beams having frequencies dependant upon the specific phosphorescent or fluorescent materials selected. The optically active materials may also include filters, mirrors, photo-reactive chemicals, or polarizing material. It is preferred that each node B and C include a light polarizing structure in order to limit the light waves to a single plane.

Phosphors are thus an integral part of the optical gate as they are the main switching components. Phosphors are materials, which emit UV, visible, or infrared light when exposed to an energy source. Conventional phosphors are either self-activated or impurity-activated. Using these types of materials in combination with the wave-guide structure creates the "on-off state", which in turn provides a functional logic gate structure.

Using the previous design and FIG. 1 as an example, a light signal is split at point A into beam components which traverse path B and C, respectively. In path C a phosphor material is imbedded which has a phosphorescent time of 1 second. As the light signal is superposed at point D a one-second pulse is created. An "on-off state" is thereby created.

Using this basic design, numerous possible combinations may be created using polarized filters, optical fibers, optical materials, multi-channeling systems, matrix—matrix designs, matrix-vector designs, or other optical systems.

Optical traces consisting of many individual cells of the general type depicted in FIG. 1, each with embedded optical chemicals and or components thus are combined to create an optical processing matrix.

This invention relates to optical devices and systems constructed either wholly or in part by methods disclosed herein, that are based on light transmissive pathways of the type shown. The pathways are preferably formed by exposing a photographic film along a pattern matching the dimensions of the desired pathway. The film is then used as a mask for exposing a cast polymer layer with photoinitiating radiation through the exposed regions of the mask to form a partially cured polymeric shape having the desired dimensions. The optical device is thus formed in the acrylate polymeric composition by exposing predetermined areas to sufficient actinic radiation to form the structure of the desired shape and dimensions.

The polarizing devices are the positioned in the polymer at locations where they will intercept the light beams prior to entering the nodes B and C. The selected phosphors are then inserted at point B and C to form the nodes. The polymers may be adhered to a base material and curing completed. In the finished matrix, the matrix pathway material may be interfaced with air on its exposed sides or, if desired, an polymer having a lower refractive index that the matrix material may be cast thereover and cured. As noted, to form a functional data processing device, it is contemplated that a large number of matrix cells of the type shown in FIG. 1 may be interconnected using connector devices such as fiber optic strands connected to the input and output points of each of the optical pathways.

As noted, the preferred materials for forming the light transmissive pathways are urethane acrylates, acrylate esters, epoxy acrylates, elastomeric acrylates, methacrylates, triacrylates, diacrylates, dimethacrylates and acrylates. Plasticizers, crosslinking agents, photoinitiators, radical scavengers and the like may be used as is known in the polymer art. In devising specific optical processor device, various organic optical polar materials, proteins, photoreactive materials, phosphorescent materials, fluorescent materials, inorganic optical materials, which may or may not undergo change in refractive index and in structure upon exposure to actinic radiation may also be incorporated into the structures. By combining these optical materials and acrylate polymers in a predetermined structure in interconnecting optical network structure can be formed into an optical processor.

As noted, the fabrication of polymeric optical devices of this invention the foregoing industrial polymers are also preferred. In the formation of an optical polymer composite, which forms the optical network processor structure, the materials must satisfy a number of requirements and manifest certain requisite properties. Among the numerous properties such material must posses; high optical transparency at wave lengths of interest 200–2000 nm (especially the 400–2000 nm spectral region), rapid and complete cure characteristics, workable fluid phase precursor consistencies prior to placement and cure, and selective and controllable refractive indices (especially the 1.4606–1.555 refractive index region). Further, it is preferred that materials to be used exhibit an adhesive characteristic able to adequately secure to the various substrates. In the fabrication of the interconnecting optical network structure, the aforementioned optical polymer materials form the substrate structure and the optical materials form the optical network processor structure. The optical network processor structure which allows computations to be performed is formed by the substrate structure in combination with the optical materials.

Optical computers of this invention are based on optical phenomena. That is, in the context of optical computing, the most basic characteristic in the transmission of information is light, specifically light which occupies a rather narrow band width between 10E14 cps and 10E15 cps. Optical computers operate in this range because of the selectivity of photo-reactive materials in this range. In describing a lightwave used to transmit information, three parameters are commonly used: frequency, amplitude, and phase.

For optical computation purposes the amplitude and the phase are sometimes linked together to form one complex value A: the modulus is the amplitude and the argument is the phase. This is referred to as the complex amplitude of the wave. When two waves combine, it is referred to as interference. If the crests in one wave coincide with the crests in the other, the waves reinforce each other, this is referred to as constructive interference. If the crests in one wave match the thoughts in the other the waves cancel out, this is referred to as destructive interference. These principles of light waves are important in optical computers for the manipulation of data. Optical processing systems use many different types of operations to manipulate data such as, multichannel systems, which is a bipolar data stream which are represented by two unipolar data streams, one of positive value and the other a negative value; spatial carrier modulation, which is a pattern of high spatial frequency imposed on the cross section of the light beam; matrices and matrix operations; matrix-vector multiplication; systolic arrays; crossbar switch; matrix—matrix multiplication.

Another optical device which enables optical processing systems to operate are the photo-refractive optical storage devices and systems. Photo-refractive storage devices are based on the photo-refractive effect which refers to the spatial modulation of the refractive index in electro-optic crystals under non-uniform illumination of light. The following processes are generally involved: 1. Generation of charged carriers from some impurity level to conduction or valence band; 2. Migration of the free carriers due to diffusion and/or drift; 3. Capturing of the charged carriers by some trap centers in the dark regions; 4. Formation of non-uniform ionic charge distribution and association non-uniform space charge field; 5. Modulation of the refractive index by space charge field via linear electro-optic effect.

As stated previously in this disclosure, various industrial polymeric materials are available for the formation of the base structure in the optical cell. Examples of polymers of this type include acrylic monomers which are used to provide diluents to the polymeric formation and enhance cure speed and physical properties of the polymeric structure. Additionally, acrylate epoxy oligomers are considered which provide resistance to a number of chemicals and have a fast cure speed with good hardness value. acrylate aliphatic urethane oligomers may be used and provide non yellowing polymers having good light transmittance, toughness, flexibility and exterior durability. acrylate aromatic urethane oligomers provide flexibility and toughness. Acrylated polyester oligomers, provide low viscosity and fast cure speeds.

Specialty polyester oligomers improve formation characteristics for lithographic processes and adhesion to substrates. Acrylated acrylic oligomers, provide non-yellowing, solvent resistance, and promote adhesion to difficult substrates. B-carboxyethyl acrylate is a reactive monomer containing both acrylate and carboxylic acid functionality, predominantly as the acrylic dimer, which contributes to low glass transition temperature and promotes adhesion. Isobornyl acrylate is a high purity, low color monofunctional diluent monomer, moisture resistant and electrical resistant, provides high Tg when actinic radiation is used to cure, may increase hardness and abrasion resistance; Octyl/decyl acrylate mixture of monofunctional monomers consisting of linear eight and ten carbon acrylate esters, diluent properties are good, high flash point, low Tg characteristics, good adhesive applications, Oxyethylated acrylate monomer, low viscosity, low Tg, good ultraviolet light and electron beam cure process; 1, 6 hexanediol diacrylate is difunctional monomer for the purpose of but not limiting, improved elasticity, weathering, adhesion, to metal and glass; Tripropylene gylcol diacrylate is a difunctional monomer with branched alkyl polyether backbone, which has the purpose of flexibility, water resistance, low viscosity and cure speed; Bisphenol-A derivative diacrylate monomer is for high reactivity and low volatility; Trimethylolpropane triacrylate is a trifunctional monomer which contributes to rapid cure response, hardness, chemical and abrasion resistance; Acrylated trifunctional monomer based on glycerol derivative has low viscosity, good flexibility, fast cure speed and excellent hardness; Pentaerythritol triacrylate a multifunctional monomer which provides a high degree of crosslinking and residual hydroxyl functionality, with rapid cure response; Trimethylolpropane ethoxy triacrylate is a trifunctional monomer which is more flexible than TMPTA and retains hardness and abrasion resistance; Acrylated dipentaerythritol is a multifunctional monomer which is used to increase cure speed and abrasion resistance.

Further polymers included in this disclosure are: Alkyl methacrylate, tetrahydrofurfuryl methacrylate, cyclohexyl methacrylate, n-Hexylmethacrylate, cyclohexyl acrylate, 2-ethoxyethyl acrylate, 2-ethoxyethyl methacrylate, isodecyl methacrylate, 2-methoxyethyl acrylate, 2(2 ethoxyethoxy) ethylacrylate, straryl acrylate, tetrahydrofufuryl acrylate, laurel methacrylate, stearyl methacrylate, Octyl acrylate, laurel acrylate, 2-phenoxyethyl acrylate, 2-phenoxyethyl methacrylate, isodecyl acrylate, isobornyl methacrylate, benzyl acrylate, hexyl acrylate, isooctyl acrylate, tridecyl methacrylate, caprolactone acrylate, ethoxylated nonyl-phenol acrylate, isobornyl acrylate, polypropylene glycol monomethacrylate, polypropylene glycol monoacrylate, triethylene glycol dimethacrylate, ethylene glycol dimethacrylate, and polyethylene glycol acrylate. This invention also includes all epoxy acrylates, elastomeric acrylates, urethane acrylates, non-nitroso monomers, metallic coagents, trifunctional monomers, tetra and pentafunctional monomers, difunctional monomers, monofunctional monomers, adhesion promoting monomers, such as alkoxylated trifunctional acrylate esters, crosslinking monomers, such a Saret brand monomers, oligomers, and photoinitiators, such as benzyldimethyl keto, trimethylbenzophenone, isopropylthioxanthone, and benzophenone, but not excluding other similar materials.

Some examples of commercially available base formulation combinations are as follows:

| Composition | wt % |
|---|---|
| Example 1 | |
| Ebecryl 3700 | 10–30 |
| Ebecryl 6700 | 10–30 |
| TMPTA | 12–80 |
| TRPGDA | 5–30 |
| Benzophenone | 1–20 |
| Methyldiethanolamine | 0.1–20 |
| DC-193 | .001–10 |
| Carnauba Wax | .01–10 |
| Example 2 | |
| Ebecryl 3600 | 10–50 |
| TMPTA | 10–90 |
| EOEOEA | 1–30 |
| Iracures | .011–10 |
| Example 3. | |
| Ebecryl 8800-20R | 10–90 |
| Ebecryl 7100 | 10–90 |
| TMPTA | 10–50 |
| TRPGDA | 1–20 |
| N-VP | 1–50 |
| Iracure | 10–90 |
| Example 4: | |
| Ebecryl 6700 | 10–50 |
| PETA-K | 20–80 |
| TMPTA | 10–60 |
| OTA-480 | 1–40 |
| Vinyl acetate | 1–30 |
| N-VP | 1–30 |
| DC-193 | 1–10 |
| Example 5. | |
| Celrad 3700 Epoxyacrylate resin | 50 |
| Trimethylolpropane triacrylate | 19 |

-continued

| Composition | wt % |
|---|---|
| Ethoxylated trimethylolpropane triacrylate | 19 |
| Polyethyleneglycol diacrylate | 10 |
| Alpha-hydroxy-alpha-cyclohexylphenyl ketone | 1 |

Other optical materials required to form the optical cell structure are luminescent compounds. Phosphors and other materials provide suitable photo reactions that are designed to provide secondary light beams used to process data in the optical cell structure. Phosphors are an integral part of the optical processor as they comprise the main switching components. Phosphors are materials which emit UV, visible, or infrared light when exposed to an energy source.

Conventional phosphors are either self-activated or impurity-activated. The former consists of two or three components, namely, the host which is the major comp(b) one or more activators, and a coactivator or charge compensator (donor) (especially if the valence of the activator deviates from the valance of the host ion it replaces in the crystal lattice). The self activated phosphors are not intentionally activated although they may contain a coactivator. The luminescent center (activator) in these phosphors appear to be a specific atomic group or individual atoms.

Examples of self-activated phosphors are:

| $MWO4$ (M=Zn, Ca, Mg, Cd) | $WO4$ (−2) Luminescent center |
|---|---|
| $MgMoO4$, $CaMoO4$ | $MoO4(-2)$ |
| $UO2$ $(C2H3O2)2$ | $UO2$ (+2) |
| ZnS | Zn vacancy |
| Rare earth salts | Rare earth ion |

The sulfides of the alkaline earths (Ca, Sr, and Ba), Zn and Cd are photo-conductive, while oxide phosphors are not. The photo conductors are much more sensitive to impurities than non-photoconductive materials. Concentrations of added impurities must be low in the range of 0.01 to 0.05% wt. Greater concentrations reduce the effect, causing a quenching effect. The best activators are Cu, Ag, Mn, an Eu+2.

The function of this material is to create complex information transmission signals in the optical cell for data manipulation when activated by the primary light beam.

The polar material (polarizers and optical filters) which are incorporated into the optical cell structure in this invention are preferably of four main types. These types are glass, gelatin, plastic, and blocking filters, but it is to be understood that this disclosure is not to be limited to any particular filter type. The preferred materials are in the form of these plastic films which are positioned transversely to the optical pathway. The wave lengths required to form the polarized structures for the optical cell range from 220 nm to greater than 1000 nm. Some examples of the types of commercially available filters are; HU-330, C 9863, HU-340, HUV-28, HB-380, HUV-30, C 5850, C 5330, PUV-4, S BG series, C 4380, C4305, C4784, H L-38, VG12, W O, W 38, W 1A, W38A, GG19, S UG19, S UG11, P 18A, S UG series, C 4000 series, C 5000 series, Ch OB series,B 12, C 48, W 36, B series, W series, S VG series, H series, GG series, H Y series, S GG series, S OG series, Ch OY series, P 16, C 3482, Ch OR series, H R-72, P 89B, C 2408, H RM-90, H RM-90, and S BG 23. (Dow or Kodak)

The optical cell structure 10 may be formed by the combination of a predetermined formulation(s) of polymeric materials with additives to form the basic foundation. The placement of the optical material in a predetermined structure 20 (in the primary layer 29), which is cured with actinic radiation, in a preferred method, forms the optical cell structure.

The method of forming the optical cell structure 10 includes the steps of:

1. forming a layer of primer base polymer 28 having a refractive index less than the primary polymeric layer 29 used to form the optical cell structure,
2. applying to a substrate and partially curing the primer layer 28 by exposure to actinic radiation,
3. mechanically placing optical components 20, 22 which are preferably phosphors producing, when activated, a secondary light beam of a preselected frequency. Polarizing materials 24 and 26 are positioned after points A and B, respectively, so that the secondary beams are limited to a single plane in the optical pathway,
4. depositing the polymeric material 29 to form the optical cell structure,
5. partially curing the layer 29 through a photographic film of similar mask to form the desired shape 10,
6. incorporating the optical components 20, 22 and 24, 26 into the optical cell structure in specified areas A and B of the optical cell (as an alternative to Step 3),
7. finalizing the cure.

The optical cells of this invention can be connected to holographic storage devices without the use of a conventional multiplexer. The multiplexing function can be incorporated into a structure which is formed by a matrix of cells of this invention. Such matrix could include at least 100 and preferably several thousand individual cells.

Holographic data recording and subsequent readout can be used to establish a massive interconnection network between the optical cell structures, in an input/output plane to array or matrix structures. Volume phase holograms are ideal for multiple storage because of their large storage capacity.

In preparing the optical switching device, a fluorescent or phosphorescent material 20, 22, a method for preparing the photo tool, and the proper polymer material formula must each be selected.

After selection of fluorescent material (for example, fluorescien or dichlorofluorescien), the frequency of light emitted upon activation of the materials may be determined using a spectrophotometer. This frequency is used in the calculation of interference as determined by the following destructive interference formula:

$$\theta m = (m + \tfrac{1}{2}) \lambda / d,$$

where $\lambda$ is the frequency.

Position A may be calculated by converting the formula to:

$$\frac{\lambda(\text{number of wave peaks in distance}\chi)}{\text{Total distance of structure}} = \text{Position A}$$

Position B may be calculated as:

$$\frac{\Lambda + \tfrac{1}{2}(\text{number of peaks in distance}\chi)}{\text{Total distance of structure}} = \text{Position B}$$

These calculations give the distance and position of the fluorescent materials 20 and 22 embedded in the polymer layer 29 required for cancellation of the two converging beams by interference.

Figure 4:
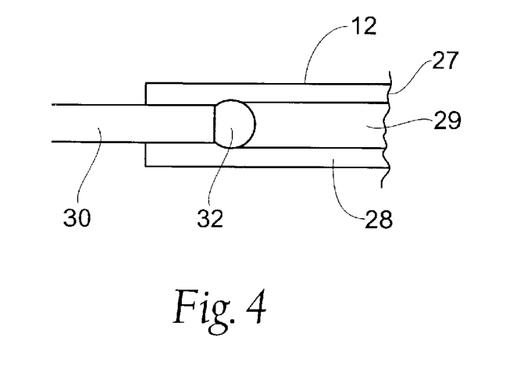

Using this information, a photo tool may be manufactured by plotting the dimensions required to create the base structure 10. As seen, structure 10 includes path branches 14 and 16 which are divided from input segment 12 and rejoined and integrally connected to output segment 18 and a junction point 40. As best seen in FIG. 4, the primary polymer strips 29 are clad at top and bottom by layers 27 and 28 of material having a lower index of refraction than that of layer 29. The sides of the shape 10 may simply interface with air if desired.

It is preferred that the Gerber Plotter System may be used, however it is to be understood that other methods may be used.

Next, polymer materials are mixed to form the optical trace material layer 29 of the optical cells. The formulations listed in Samples 1–3 are examples of polymer materials which may be used in the formation of the optical switching device of the present invention.

| Polymer material | WT % |
|---|---|
| SAMPLE 1 | |
| Eb 6700 | 65 |
| TMPTA | 10 |
| TRPGDA | 20 |
| Irgacure 500 | 5 |
| SAMPLE 2 | |
| Eb 3600 | 65 |
| TMPTA | 20 |
| TRPGDA | 10 |
| Irgacure 500 | 5 |
| SAMPLE 3 | |
| Eb 6700 | 82 |
| TMPTA | 5 |
| TRPGDA | 10 |
| Irgacure 500 | 3 |

The formation of the optical layer 29 is completed using 1000 Watt ultraviolet light to cure the polymer layer. Exposure time is preferably 30–50 seconds, although it is within the realm of the present invention to include other cure times. Exposure to the ultraviolet light forms a rigid structure 10, which encapsulates the fluorescent material 20, 22 at the pre-determined, calculated node locations A and B. The interference parameters required to create the off signals are provided in this manner.

Next, an ultraviolet light source is transmitted into a fiber optic 30, which has been attached to the polymer layer 29 during the curing formation of that layer as illustrated in FIG. 4. A ball lens 32 is used to connect fiber optic material 30 to polymer layer 29. The ultraviolet light excites the fluorescent material 20 and 22 and induces light having a pre-determined frequency. This secondary light then travels to the interference location 40. The interference location 40 is pre-determined using calculations previously mentioned. The induced light signal is then canceled out at that location. The light measurements are as follows:

1. Using a Radiometer UVP the amount or intensity of light is measured.
2. The source light is at a power of 5.7 to 5.6 mW/cm$^2$.
3. The power of the signal using the fluorescien through the fiber optic 30 is 3.2 $\mu$W/cm2 and through the polymer layer 29 the power reading is 2.6 to 2.3 $\mu$W/cm2.

Figure 3:
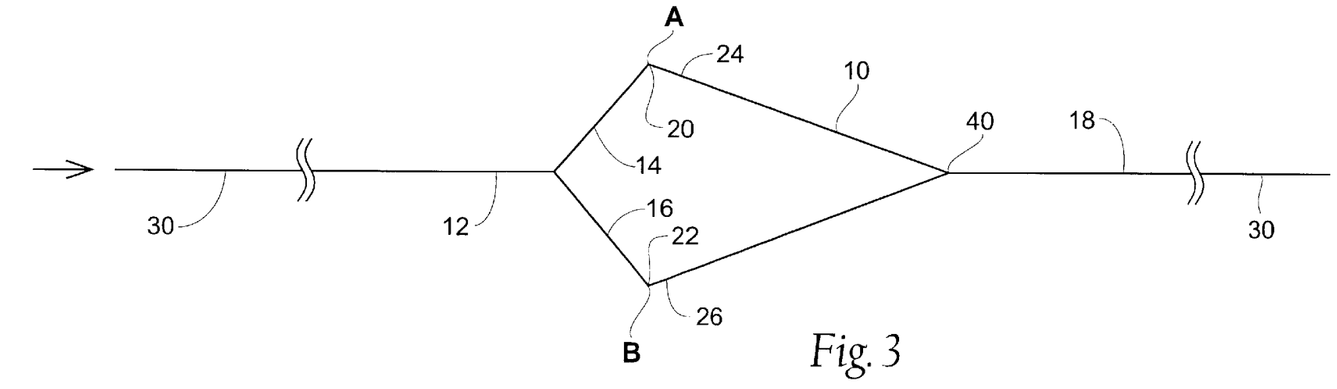
FIG. 3 is another diagram of a simplified optical circuit illustrating a single cell of an optical processor device; and, FIG. 4 is a fragmentary cross sectional view of a connection between a fiber optic material and an optical circuit cell of this invention.

4. Using this information as the base signal power level the optical switch structure is then attached to the UV light source by use of the fiber optic 30. Power level measurements were made using Sample 1. The results related to FIG. 3 are as follows:

Sample 1: With the fluorescent material 20 placed at node location A only, the polymer trace had a power reading of 0.95 $\mu$W/cm2. Sample 1 location B had no fluorescent material.

Sample 2: With the fluorescent material 20 placed at node location A only, the polymer trace had a power reading of 1.95 $\mu$W/cm2. Sample 2 location B had no fluorescent material.

Sample 3: With the fluorescent material 20 placed at node location A only, the polymer trace 10 had a power reading of 2.2 $\mu$W/cm2. Sample 3 location B had no fluorescent material.

A subsequent test placing the fluorescent material at both node locations A and B produced a power reading of 0 $\mu$W/cm2 for each of the Samples 1–3 tested. This demonstrated that an interference pattern was created.

Using this design, the following matrix can be designed for switching parameters:

| Signal source | Signal |
|---|---|
| Location A only | ON |
| Location B only | ON |
| Location A/B only | OFF |

What is claimed is:

1. An optical circuit comprising a base layer having a first refractive index and a core layer bonded to said base layer,
   said core layer having a second refractive index greater than said first refractive index,
   said core layer being formed of a polymeric light transmissive composition and containing first and second optical pathways each having opposed first and second ends and at least one junction between said first and second optical pathways, and,
   each of said first and second pathways including a node containing photoreactive material which, when activated by passage of light beam from a primary light source through its associated pathway is caused to emit a secondary light beam into said pathway.

2. An optical circuit according to claim 1 wherein a light polarizing device is positioned to intercept said primary light beam prior to said beam impacting said photoreactive material.

3. An optical circuit according to claim 2 wherein said photo-reactive material comprises a phosphorescent material or a fluorescent material.

4. An optical circuit according to claim 1 wherein secondary light beams superpose at said junction and a beam traveling on said first path to said junction is caused to be 180° out of phase with a beam traveling on said second path.

5. An optical circuit according to claim 1 wherein a fiber optic strand having a central axis is embedded in said polymeric composition with its axis being in alignment and in light-transmitting contact with a selected one of said first and second optical pathways.

6. An optical circuit according to claim 1 wherein said polymeric material is selected from the group consisting of urethane acrylates, acrylate esters, epoxy arcylates, elastomeric acryaltes, methacrylates, triacrylates, diacrylates and dimethylacrylates.

7. An optical processor for use with at least one optical radiation source generating optical radiation comprising:
   an acrylic or methacrylic polymer matrix having a multiple light path structure and defining a plurality of optical processing cells within the matrix, each of said cells comprising a circuit according to claim 1.

8. A process for manipulating data comprising
   providing an optical circuit comprising a base layer having a first refractive index and a core layer bonded to said base layer, said core layer having a second refractive index greater than said first refractive index, said core layer being formed of a polymeric light transmissive composition and containing first and second optical pathways each having opposed first and second ends and at least one junction between said first and second optical pathways, each of said first and second pathways including a node containing photoreactive material which, when activated by passage of light beam from a primary light source through its associated pathway is caused to emit a secondary light beam into said pathway,
   causing selected beams of light to enter and to be split to traverse said first an second pathways to activate said photoreactive material in each of said nodes to produce first and second secondary light beams, said secondary light beams being out of phase and thereby cancelling each other whereby an off signal is produced, and
   using said off signals in conjunction with a plurality of other optical signals to produce processible data.

* * * * *

UNITED STATES PATENT AND TRADEMARK OFFICE
CERTIFICATE OF CORRECTION

PATENT NO. : 6,532,317 B2 Page 1 of 1
DATED : March 11, 2003
INVENTOR(S) : Raymond J. Hanneman, Jr.

It is certified that error appears in the above-identified patent and that said Letters Patent is hereby corrected as shown below:

<u>Column 14,</u>
Line 15, after "expoxy" delete "arcylates," and substitute -- acrylates --.
Lines 15-16, after "elastomeric" delete "acryaltes" and substitute -- acrylates --.

Signed and Sealed this

Seventh Day of March, 2006

JON W. DUDAS
*Director of the United States Patent and Trademark Office*